United States Patent [19]
Okawa

[11] Patent Number: 5,781,870
[45] Date of Patent: Jul. 14, 1998

[54] VEHICLE STEERING ANGLE CONTROL DEVICE

[75] Inventor: Yukio Okawa, Yokohama, Japan

[73] Assignee: Komatsu Ltd., Tokyo, Japan

[21] Appl. No.: 836,133

[22] PCT Filed: Nov. 10, 1995

[86] PCT No.: PCT/JP95/02297

§ 371 Date: May 8, 1997

§ 102(e) Date: May 8, 1997

[87] PCT Pub. No.: WO96/15483

PCT Pub. Date: May 23, 1996

[30] Foreign Application Priority Data

Nov. 10, 1994 [JP] Japan ............... 6-276670

[51] Int. Cl.$^6$ ............... G06F 165/00; G05D 1/02
[52] U.S. Cl. ............... 701/25; 701/41; 701/202; 701/217; 180/408; 180/415
[58] Field of Search ............... 364/424.029, 424.027, 364/424.031, 444.2, 447, 449.2, 450, 424.051, 424.07; 180/169, 408, 409, 410, 415, 422, 445; 318/587

[56] References Cited

U.S. PATENT DOCUMENTS 4,600,999  7/1986  Ito et al. ............... 364/424.029
4,628,454  12/1986 Ito ............... 364/424.029
4,700,427  10/1987 Knepper ............... 180/169
4,803,640  2/1989  Mitomi et al. ............... 364/167.01
4,860,209  8/1989  Sugimoto et al. ............... 364/424.029
5,264,709  11/1993 Kamimura et al. ............... 180/169

FOREIGN PATENT DOCUMENTS 1-161414  6/1989  Japan.
2-105904  4/1990  Japan.
5-17704   3/1993  Japan.

Primary Examiner—Tan Q. Nguyen
Attorney, Agent, or Firm—Diller, Ramik & Wight, PC

[57] ABSTRACT

A vehicle steering angle control device which accurately guides a vehicle along a predetermined drive course by accurately controlling a steering angle of the vehicle based on a degree of curvature of a curved course on which the vehicle is currently running and a current speed of the vehicle in which the degree of curvature of the curved course on which the vehicle is currently running is determined by calculating a degree of deviation of the vehicle relative to a vehicle advancing direction corresponding to current vehicle advancing direction data or an integration of the degree of deviation and a current speed of the vehicle is detected; a steering angle suitable for the degree of curvature of the curved course and the current speed of the vehicle is found and the steering angle of the vehicle is controlled to realize the suitable steering angle, whereby the vehicle is guided along the predetermined driving course.

3 Claims, 4 Drawing Sheets

VEHICLE STEERING ANGLE CONTROL DEVICE

TECHNICAL FIELD

The present invention relates to a vehicle guidance system for storing position data pertaining to a predetermined driving course, and for guiding the vehicle along the predetermined driving course by controlling the steering angle of the vehicle on the basis of this position data.

BACKGROUND ART

Several systems for guiding vehicles along predetermined driving courses have been developed and submitted for patent application in the past.

Japanese Patent Publications 5-22925 and 5-22926 teach a technique of approximating the driving course by connecting a plurality of straight line segments and guiding the vehicle along these straight line segments.

While the technique taught in these publications has the advantage that calculation of the vehicle steering angle or the like is easy since the vehicle needs only to move forward in a straight line, it has the drawback that, since curved driving course paths are approximated by straight lines, the vehicle does not follow the predetermined driving course in an exact manner.

Further, the technique taught in the aforementioned publications sets the vehicle steering angle without regard for current vehicle speed.

Thus, when the vehicle is traveling at high speed, the steering angle can be too great, creating the possibility of oversteering and, in some cases, causing the vehicle to deviate from the curved driving course. Conversely, when the vehicle is traveling at low speed, the steering angle can be too small, creating the possibility of understeering and, in some cases, causing the vehicle to deviate from the curved driving course.

Further, in the technique taught in the aforementioned publications, the steering angle when the vehicle follows a straight-line course without deviation is set to zero for reasons pertaining to the steering angle calculation process.

However, in the case of a vehicle such as a dump truck, the alignment of the four wheels of the vehicle can change depending on the load and load distribution. When the alignment changes, continuing to move with the steering angle set at zero can cause the vehicle to deviate from a straight-line course. This presents significant practical problems.

Japanese Patent Publication 5-503775 teaches calculating the steering angle by plotting from the current position a smoothly linked path, expressed by a polynomial of degree 5, over the driving course and guiding the vehicle along this path.

While the technique taught in this publication does take into account travel over a curved driving course, the calculations are quite complex and time-consuming.

Like the aforementioned Japanese Patent Publications 5-22925 and 5-22926, the technique taught in the aforementioned publication sets the vehicle steering angle without regard for current vehicle speed. This gives rise to the possibility of deviation from a curved driving course.

Also, like the aforementioned Japanese Patent Publications 5-22925 and 5-22926, the steering angle when the vehicle follows a straight-line course without deviation is set to zero, so if there is not perfect alignment between the front and rear wheels of the vehicle, it becomes extremely difficult to prevent the vehicle from traveling along the straight-line course without deviation.

Thus, conventional techniques have the drawback of being incapable of affording travel in an exact manner over a curved driving course by means of a simple process.

They also have the problem of deviation from a curved driving course depending on vehicle speed.

A further problem is that changes in vehicle alignment can result in deviation from the predetermined course, even when the driving course is straight course.

DISCLOSURE OF THE INVENTION

It is an object of the present invention to provide a system that can overcome these problems.

The first invention of this invention is intended to accurately guide the vehicle over a curved driving course by means of a simple process, and to prevent the vehicle from deviating from a curved driving course regardless of vehicle speed.

These objects are achieved through a vehicle guidance system for storing position data pertaining to a predetermined driving course and for guiding the vehicle along the predetermined driving course by controlling the steering angle of the vehicle on the basis of this position data, comprising memory means for storing, for each point on the aforementioned predetermined driving course, data indicating the coordinate position for the point in question and the direction in which the vehicle should advance, position detection means for detecting the current coordinate position of the vehicle, speed detection means for detecting the current speed of the vehicle, selection means for selecting from the memory contents of the memory means coordinate position data for the point on the predetermined driving course that is closest to the current coordinate position detected by the position detection means and direction of advance data for this closest point, deviation calculation means for calculating the current deviation of vehicle position in the direction perpendicular to the direction of vehicle advance on the basis of the coordinate position data and direction of advance data selected by the selection means and the current coordinate position detected by the position detection means, steering angle calculation means for calculating the vehicle steering angle so as to decrease with increased detected travel speed on the basis of the deviation calculated by the deviation calculation means and the current speed detected by the speed detection means in order to reduce deviation to zero, and control means for controlling the steering angle of the vehicle on the basis of the vehicle steering angle calculated by the steering angle calculation means.

In addition to the objects of the first invention stated above, it is a further object of the second invention of this invention to compensate for and cancel out changes in vehicle alignment in order to accurately guide the vehicle over a predetermined driving course.

This object is achieved by further providing the structure of the first invention with integration operation means for performing integration operations on the deviation calculated by the deviation calculation means, and by configuring the steering angle calculation means to calculate the vehicle steering angle so as to decrease with increased detected travel speed on the basis of the deviation calculated by the deviation calculation means, the integral calculated by the integration operation means, and the current speed detected by the speed detection means in order to reduce the deviation to zero.

In addition to the objects of the first invention stated above, it is a further object of the third invention of this invention to accurately guide the vehicle over a course whose radius of curvature varies in complex fashion.

This object is achieved by further providing the structure of the first invention with integration operation means for performing integration operations on the deviation calculated by the deviation calculation means, by replacing the steering angle calculation means with first steering angle calculation means for calculating a first vehicle steering angle so as to decrease with increased detected travel speed on the basis of the deviation calculated by the deviation calculation means, the integral calculated by the integration operation means in order to reduce the deviation to zero, and the current speed detected by the speed detection means, second steering angle calculation means for calculating a second vehicle steering angle on the basis of the radius of curvature of the predetermined course at the closest point, and third steering angle calculation means for calculating a third vehicle steering angle on the basis of the first vehicle steering angle calculated by the first steering angle calculation means and the second vehicle steering angle calculated by the second steering angle calculation means, and by employing as the control means control means that controls steering angle of the vehicle on the basis of the third vehicle steering angle calculated by the third steering angle calculation means.

In accordance with the first invention, the current deviation of vehicle position in the direction perpendicular to the direction of vehicle advance is calculated on the basis of the coordinate position data and direction of advance data selected by the selection means and the current coordinate position detected by the position detection means. Thus, deviation from a curved driving course may be readily calculated.

Furthermore, the vehicle steering angle is calculated so as to decrease with increased detected travel speed on the basis of the deviation calculated by the deviation calculation means and the current speed detected by the speed detection means in order to reduce deviation to zero. Thus, vehicle steering angle may be calculated easily and accurately with reference to current vehicle speed.

Furthermore, the vehicle steering angle is controlled on the basis of the vehicle steering angle calculated by the steering angle calculation means, allowing the vehicle to be accurately guided over the predetermined course.

In accordance with the second invention, the deviation calculated by the deviation calculation means is subjected to an integration operation. The vehicle steering angle is calculated so as to decrease with increased detected travel speed on the basis of the deviation calculated by the deviation calculation means, the integral calculated by the integration operation means, and the current speed detected by the speed detection means in order to reduce the deviation to zero. Since the steering angle is calculated with reference to the integral of deviation, vehicle steering angles which compensate for and cancel out changes in vehicle alignment can be calculated correctly in order to accurately guide the vehicle over a predetermined driving course.

In accordance with the third invention, a second vehicle steering angle is calculated on the basis of the radius of curvature of the predetermined course at the point closest to the current vehicle position. A third vehicle steering angle is then calculated on the basis of the deviation-based first steering angle and the second steering angle, and the vehicle steering angle is controlled on the basis of this third vehicle steering angle. As a result, the second steering angle, which is based on the curvature of the course, can be nimbly maintained, allowing the vehicle to be guided around the course in an approximate fashion, while deviation from the course is corrected through the deviation-based first steering angle, allowing the vehicle to be accurately guided along a course whose radius of curvature varies in complex fashion.

BEST MODE FOR CARRYING OUT THE INVENTION

An embodiment of the vehicle guidance system which pertains to the present invention will be described with reference to the drawings.

Figure 1:
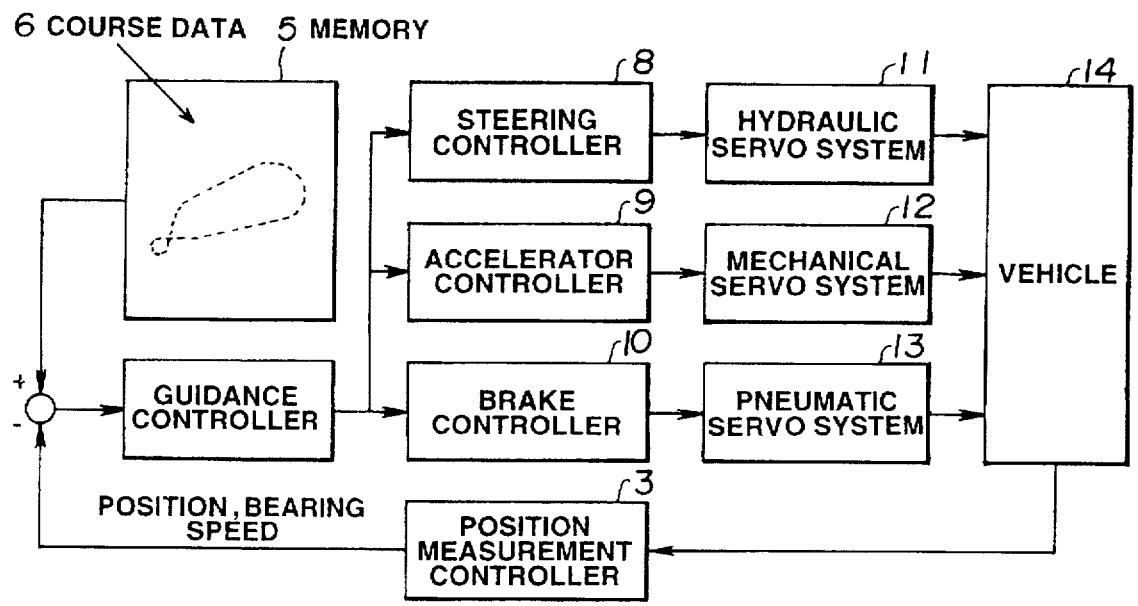
FIG. 1 is a block diagram depicting the structure of an embodiment of the vehicle guidance system which pertains to the present invention.
Figure 2:
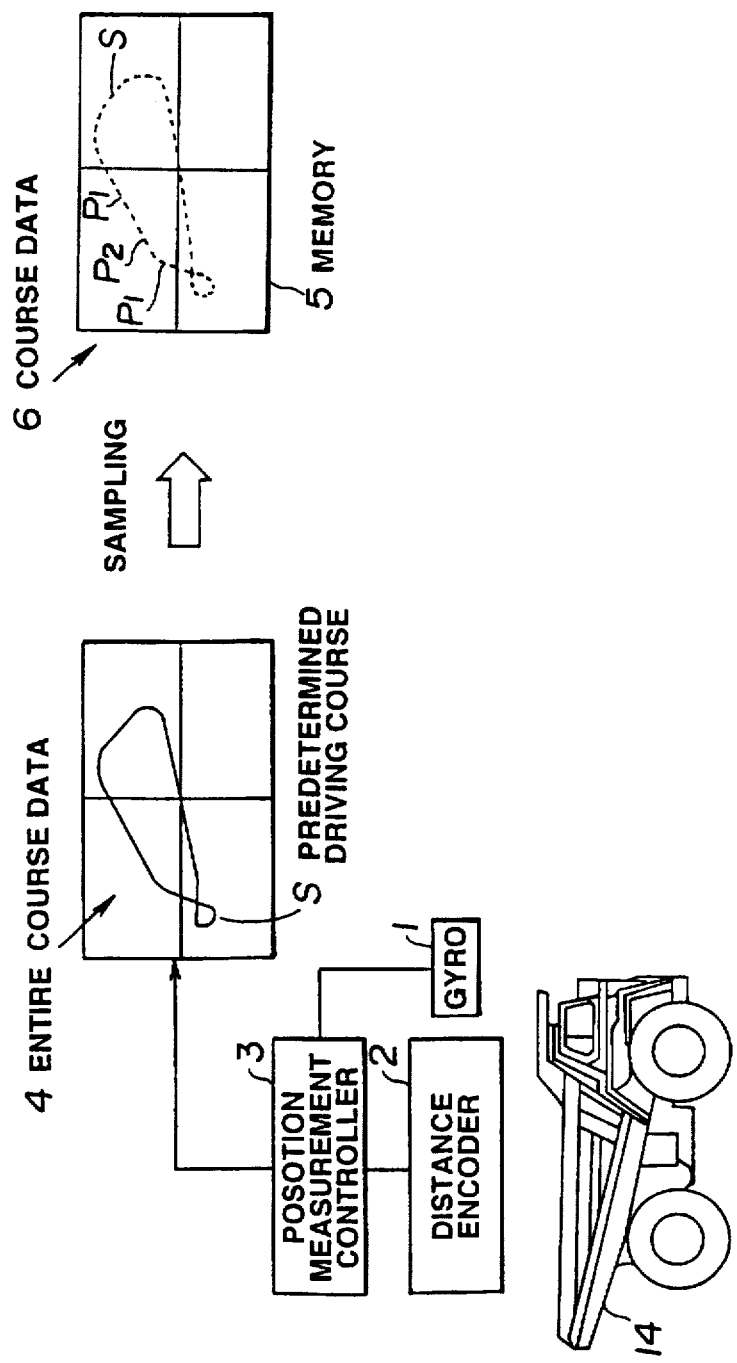
FIG. 2 is a block diagram which illustrates the process for obtaining predetermined course data through teaching.

FIG. 1 is a block diagram depicting the vehicle guidance system of the embodiment. FIG. 2 is a block diagram which illustrates the teaching process conducted prior to actual guidance.

Predetermined Course Teaching

In the embodiment, it is supposed that the vehicle to be driven is the unmanned dump truck (hereinafter termed "vehicle") 14 which is shown in FIG. 2.

The vehicle 14 is to be driven unmanned over a predetermined course S, for example. Data representing the predetermined course S is taught, that is, set and stored in the memory 5 provided to the vehicle 14, by means of a teaching operation in which the vehicle is driven by a human operator once around the course to be traveled.

The vehicle 14 is equipped with a gyro 1 for detecting the direction of advance, a distance encoder 2 for detecting travel distance, and a position measurement controller 3 which controls the gyro 1 and the distance encoder 2.

During the teaching run, a vehicle 14 positional coordinate series, a vehicle 14 direction of advance series, and a vehicle 14 speed series are calculated by the position measurement controller 3 on the basis of the detection signals output by the gyro 1 and the distance encoder 2. These are output as entire course data 4.

The entire course data 4 is output several to several dozen times per second, and thus represents a considerable volume of data; to adjust the size to one suited for the memory capacity of the memory 5, sampling is conducted at a prescribed interval τ. The sampling interval x is an optimal interval that is neither too great or too small.

The sampling operation produces a vehicle 14 positional coordinate series P1 (X1, Y1), P2 (X2, Y2) . . . Pi (Xi, Yi) . . . , a vehicle 14 direction of advance (bearing) series $\phi$1, $\phi$2, . . . $\phi$i . . . , and a vehicle 14 speed series V1, V2, . . . Vi, . . . which are stored as course data 6 in the memory 5.

For each point P1, P2, . . . Pi . . . on the predetermined course S, positional coordinates (Xi, Xj) indicating where the vehicle 14 should be positioned, the direction of advance $\phi$i in which the vehicle 14 should go, and the speed Vi at which the vehicle 14 should move are stored in the memory 5.

In this embodiment, course data 6 is calculated using a teaching process, but any method of calculation may be used, including measurement and the like.

Automatic Guidance

Figure 4:
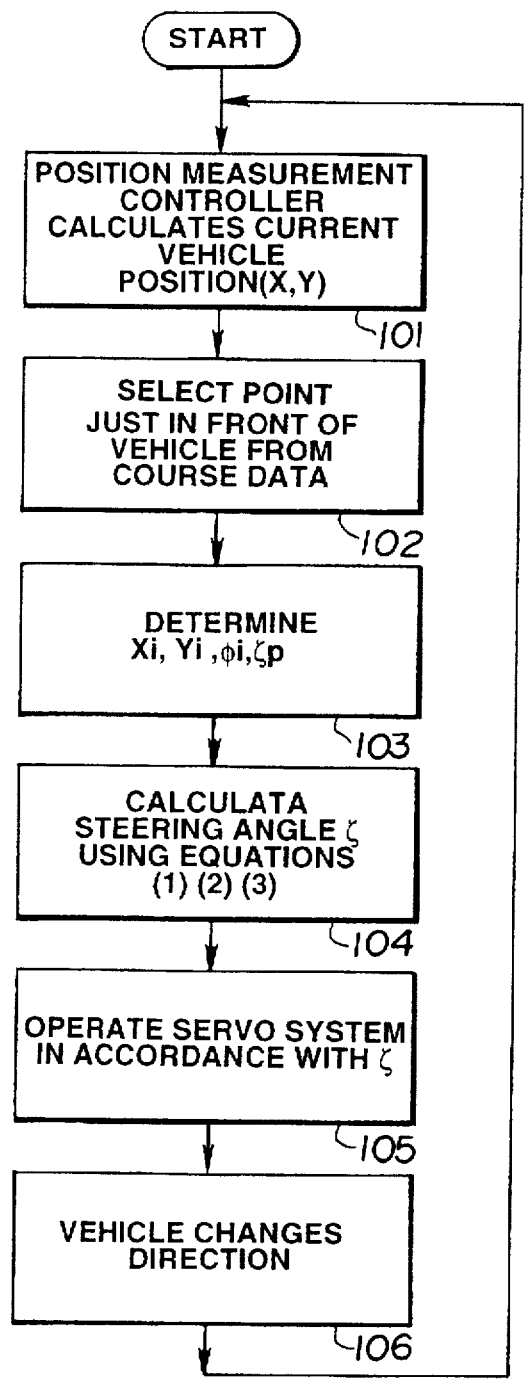
FIG. 4 is a flow chart depicting the processing order in automatic vehicle guidance.

The steps in the automatic guidance process for the vehicle 14 will be explained referring to the flow chart in FIG. 4.

When the teaching run has been completed and automatically guided operation (playback) begins, detection signals are output by the gyro 1 and the distance encoder 2, and the current position Q (X, Y) of the vehicle 14 is calculated by the position measurement controller 3 and output to the guidance controller 7 (step 101).

The guidance controller 7 calculates a target steering angle $\xi$, described later, whereupon, through the agency of a steering controller 8, the steering (not shown) of the vehicle 14 is operated by means of a hydraulic servo system 11 in order to change the direction of the vehicle 14 to produce the aforementioned target steering angle $\xi$ (steps 102–106).

The guidance controller 7 also calculates a target speed for the vehicle 14, described later, whereupon, through the agency of an accelerator controller 9 and a brake controller 10, the accelerator and brakes (not shown) of the vehicle 14 are operated by means of a mechanical servo system 12 and a pneumatic servo system 13 in order to change the speed of the vehicle 14 to produce the aforementioned target speed.

The computations for the aforementioned target steering angle will now be described in more detail.

Figure 3:
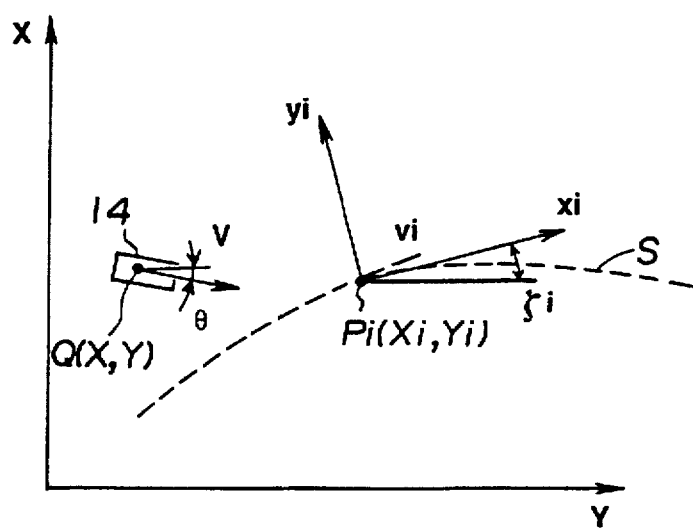
FIG. 3 is a diagram of geometric relationships illustrating the process for computing vehicle steering angle.

The most proximate point Pi on the driving course S lying ahead of the current position Q (X, Y) of the vehicle 14 in the direction of advance of the vehicle 14 is selected (step 102; see FIG. 3).

Positional coordinate data (Xi, Yi) and bearing data $\phi i$ for the selected point Pi are read out from the memory 5.

A basic steering angle $\xi p$ which corresponds to the radius of curvature of the driving course S at the most proximate point Pi is calculated in the manner described later (step 103).

On the basis of the course positional coordinates (Xi, Yi), the bearing $\phi i$, and the basic steering angle $\xi p$, and the current vehicle position Q (X, Y) so obtained, the operations represented by equations (1), (2), and (3), below, are performed to calculate the target steering angle $\xi$ for the vehicle 14.

$$yi = -(X-Xi) \sin \phi i + (Y-Yi) \cos \phi i \quad (1)$$

$$\alpha s = -(K4+K5 \cdot K6) yi - K4 \cdot K6 \int yi dt - K5 dyi/dt \quad (2)$$

$$\xi = \tan^{-1}(\alpha s L/V^2) + Kp \cdot \xi p \quad (3)$$

Here, K4, K5, K6, and Kp are control constants, and L is the wheel base (distance between front and rear axles) of the vehicle 14.

V is the current speed of the vehicle 14; it is input to the guidance controller 7 through the agency of the position measurement controller 3.

Equations (1) through (3), given above, will now be discussed. The basic steering angle p represented by equation (3) is calculated from (4) through (7), below.

Where V represents the speed of the vehicle 14 and $\alpha$ represents the sampling interval, the length G of an arc lying on the predetermined driving course S which connects point Pi and the next point Pi+1 on the course is computed as follows:

$$G = V \cdot \tau \quad (4)$$

Where Ri is the radius of curvature of the arc which connects point Pi and the next point Pi+1, the arc length G may also be computed as follows:

$$G = Ri \cdot (\phi i+1 - \phi i) \quad (5)$$

From equations (4) and (5), the radius of curvature Ri may be computed using equation (6), below.

$$Ri = V \cdot \tau / (\phi i+1 - \phi i) \quad (6)$$

Using the radius of curvature Ri so calculated and the wheel base L, the basic steering angle p may be obtained using equation (7), below.

$$\xi p = \arctan (L/Ri) \quad (7)$$

In equation (1), above, the Y-axis coordinate position Y (current position) of the vehicle 14 in an X-Y fixed coordinate system is converted to the coordinate yi in a local coordinate system xi-yi.

Specifically, as shown in FIG. 3, an xi-yi coordinate system in which the point Pi on the predetermined driving course S is designated as the origin, the direction of the speed Vi (vector) which the vehicle 14 should put out at point Pi, i.e., the direction of advance $\phi i$, is designated as the xi axis, and the normal direction of the course S is designated as the yi axis is established as the local coordinate system. Thus, the converted coordinate position yi indicates deviation of the vehicle 14 in the normal direction of the predetermined driving course S (the direction perpendicular to the direction of advance). The target steering angle $\xi$ required to bring deviation in the normal direction, yi, to zero is computed using equation (3).

The X-axis coordinate position X (current position) of the vehicle 14 in the X-Y fixed coordinate system is converted to xi in the local coordinate system xi-yi in the manner indicated by equation (8), below.

$$xi = (X-Xi) \cos \phi i + (Y-Yi) \sin \phi i \quad (8)$$

The deviation in the normal direction, yi, calculated using the aforementioned equation (1) is substituted into the aforementioned equation (2), the acceleration in the lateral (normal) direction of the vehicle 14, as, is calculated, and this lateral direction acceleration as is substituted into the aforementioned equation (3) to calculate the target steering angle $\xi$.

Here, the lateral direction acceleration as includes the normal direction deviation yi integral $-K4 \cdot K6 \int yi dt$, so this integral is added to the target steering angle $\xi$.

Thus, when the steering of the vehicle 14 is controlled in such a way that this target steering angle $\xi$ becomes zero, even if the vehicle 14 should be out of alignment, the aforementioned integral compensates for and cancels out the aberration, making it possible for the vehicle 14 to travel along a straight-line course without deviation.

The target steering angle $\xi$ computed in equation (3) is proportional to $1/V^2$. Thus, the higher the current speed V of the vehicle 14, the smaller the steering angle becomes, and the lower the speed V, the greater the steering angle becomes. As a result, the steering can be turned at the angle most appropriate for the speed, preventing the vehicle 14 from deviating from the course S.

The calculations given earlier are not complex operations that require calculation of complex polynomial expressions, but are rather simple operations. Thus, the vehicle 14 can be accurately guided along a curved course by means of a simple process that does not require complex calculations (steps 103, 104, 105).

The current bearing θ of the vehicle 14 is calculated by the position measurement controller 3 computes and is input to the guidance controller 7. The target speed Vxi, Vyi for the vehicle 14 is then computed on the basis of the current bearing θ, the current speed V, and the bearing hi with reference to point Pi using equations (9), (10), and (11), below.

$$\theta i = \theta - \phi i \quad (9)$$

$$Vxi = V \cos \theta i \quad (10)$$

$$Vyi = V \sin \theta i \quad (11)$$

In equation (9), θ is approximately equal to φi, so θi becomes zero and the lateral (normal) direction speed Vyi becomes zero as well. Thus, it is sufficient to simply control the longitudinal (tangent) direction speed Vxi indicated by equation (10); this is output as the target speed to the accelerator controller 9 and the brake controller 10, whereby the accelerator and a brakes are controlled.

As noted earlier, in accordance with the present invention the vehicle steering angle is calculated using simple operations, making it possible to readily guide the vehicle over a curved driving course by means of a simple process.

Since the calculated steering angle is smaller the greater the traveling speed, the vehicle can be accurately guided over a curved driving course without deviating from it.

Since reference is made to the integral of deviation in the normal direction of the driving course when calculating the steering angle, the vehicle can be accurately guided along a predetermined driving course even if the vehicle should be out of alignment.

Since the required steering angle is given by a basic steering angle based on the curvature of the driving course, and deviation from the course is corrected by adding a deviation-based steering angle, the vehicle can be guided accurately and without delayed response, even over a curved course whose radius of curvature changes in a complex manner.

INDUSTRIAL APPLICABILITY

The present invention has potential application in both unmanned and manned vehicles. The present invention is not limited to dump trucks and other vehicles which are operated outdoors, but has potential application in vehicles operated indoors, such as unmanned carrier vehicles and the like.

I claim:

1. A vehicle guidance system for storing position data pertaining to a predetermined driving course and for guiding the vehicle along the predetermined driving course by controlling the steering angle of the vehicle on the basis of this position data, comprising:

memory means for storing, for each point on the aforementioned predetermined driving course, data indicating the coordinate position for the point in question and the direction in which the vehicle should advance;

position detection means for detecting the current coordinate position of the vehicle;

speed detection means for detecting the current speed of the vehicle;

selection means for selecting from the memory contents of the memory means coordinate position data for the point on the predetermined driving course that is closest to the current coordinate position detected by the position detection means and direction of advance data for this closest point;

deviation calculation means for calculating the current deviation of vehicle position in the direction perpendicular to the direction of vehicle advance corresponding to the selected direction of advance data on the basis of the coordinate position data and direction of advance data selected by the selection means and the current coordinate position detected by the position detection means;

steering angle calculation means for calculating the vehicle steering angle so as to decrease with increased detected travel speed on the basis of the deviation calculated by the deviation calculation means and the current speed detected by the speed detection means in order to reduce deviation to zero; and control means for controlling the steering angle of the vehicle on the basis of the vehicle steering angle calculated by the steering angle calculation means.

2. A vehicle guidance system for storing position data pertaining to a predetermined driving course and for guiding the vehicle along the predetermined driving course by controlling the steering angle of the vehicle on the basis of this position data, comprising:

memory means for storing, for each point on the aforementioned predetermined driving course, data indicating the coordinate position for the point in question and the direction in which the vehicle should advance;

position detection means for detecting the current coordinate position of the vehicle;

speed detection means for detecting the current speed of the vehicle;

selection means for selecting from the memory contents of the memory means coordinate position data for the point on the predetermined driving course that is closest to the current coordinate position detected by the position detection means and direction of advance data for this closest point;

deviation calculation means for calculating the current deviation of vehicle position in the direction perpendicular to the direction of vehicle advance corresponding to the selected direction of advance data on the basis of the coordinate position data and direction of advance data selected by the selection means and the current coordinate position detected by the position detection means;

integration operation means for performing integration operations on the deviation calculated by the deviation calculation means;

steering angle calculation for calculating the vehicle steering angle so as to decrease with increased detected travel speed on the basis of the deviation calculated by the deviation calculation means, the integral calculated by the integration operation means, and the current speed detected by the speed detection means in order to reduce the deviation to zero; and control means for controlling the steering angle of the vehicle on the basis of the vehicle steering angle calculated by the steering angle calculation means.

3. A vehicle guidance system for storing position data pertaining to a predetermined driving course and for guiding the vehicle along the predetermined driving course by controlling the steering angle of the vehicle on the basis of this position data, comprising:

memory means for storing, for each point on the aforementioned predetermined driving course, data indicating the coordinate position for the point in question and the direction in which the vehicle should advance;

position detection means for detecting the current coordinate position of the vehicle;

speed detection means for detecting the current speed of the vehicle;

selection means for selecting from the memory contents of the memory means coordinate position data for the point on the predetermined driving course that is closest to the current coordinate position detected by the position detection means and direction of advance data for this closest point;

deviation calculation means for calculating the current deviation of vehicle position in the direction perpendicular to the direction of vehicle advance on the basis of the coordinate position data and direction of advance data selected by the selection means and the current coordinate position detected by the position detection means;

integration operation means for performing integration operations on the deviation calculated by the deviation calculation means;

first steering angle calculation means for calculating a first vehicle steering angle so as to decrease with increased detected travel speed on the basis of the deviation calculated by the deviation calculation means, the integral calculated by the integration operation means, and the current speed detected by the speed detection means in order to reduce the deviation to zero;

second steering angle calculation means for calculating a second vehicle steering angle on the basis of the radius of curvature of the predetermined course at the closest point;

third steering angle calculation means for calculating a third vehicle steering angle by adding the value obtained by multiplying the first vehicle steering angle calculated by the first steering angle calculation means by a prescribed coefficient with a value obtained by multiplying the second vehicle steering angle calculated by the second steering angle calculation means by a prescribed coefficient; and control means for controlling the steering angle of the vehicle on the basis of the third vehicle steering angle calculated by the third steering angle calculation means.

* * * * *